US006201311B1

(12) United States Patent
Kamei et al.

(10) Patent No.: US 6,201,311 B1
(45) Date of Patent: Mar. 13, 2001

(54) VEHICLE STARTER WITH SEPARATE TERMINALS FOR THE MOTOR AND THE EXCITATION COIL

(75) Inventors: Koichiro Kamei; Shigeru Shiroyama; Akira Kuragaki; Motoi Hisamoto; Takehiro Kobayashi; Hidekazu Katayama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,221

(22) Filed: Mar. 20, 2000

(30) Foreign Application Priority Data

Sep. 29, 1999 (JP) ................................................ 11-275788

(51) Int. Cl.$^{7}$ ...................................................... H02K 23/60
(52) U.S. Cl. ........................................... 290/38 R; 290/48
(58) Field of Search ..................................... 290/38 R, 48; 310/23; 74/6; 335/126

(56) References Cited

U.S. PATENT DOCUMENTS

| | | | | |
|---|---|---|---|---|
| 4,366,385 | * | 12/1982 | Williams | 290/38 R |
| 4,907,464 | * | 3/1990 | Isozumi | 74/7 A |
| 4,924,126 | * | 5/1990 | Isozumi | 310/83 |
| 5,760,487 | * | 6/1998 | Kimura et al. | 290/48 |
| 5,789,821 | * | 8/1998 | Shiga et al. | 290/38 R |
| 5,818,118 | * | 10/1998 | Kimura et al. | 290/48 |
| 5,877,575 | * | 3/1999 | Nara et al. | 310/239 |

FOREIGN PATENT DOCUMENTS

| | | | | |
|---|---|---|---|---|
| 0485372A2 | * | 5/1992 | (EP) . | |
| 2488041 | * | 2/1982 | (FR) . | |
| 57-54188 | | 11/1982 | (JP) | H01H/50/14 |
| 10-30534 | | 2/1998 | (JP) | F02N/15/06 |

* cited by examiner

*Primary Examiner*—Nestor Ramirez
*Assistant Examiner*—Joseph Waks
(74) *Attorney, Agent, or Firm*—Sughrue, Mion, Zinn, Macpeak & Seas, PLLC

(57) ABSTRACT

A starter in which a terminal is each provided for a motor side fixed contact point and an excitation coil separately, and the terminal of the motor side fixed contact point and the terminal of the excitation coil are of a snap-on type.

Therefore, the work efficiency of connecting the motor side fixed contact point and the excitation coil of the electromagnetic switch can be improved.

4 Claims, 7 Drawing Sheets

VEHICLE STARTER WITH SEPARATE TERMINALS FOR THE MOTOR AND THE EXCITATION COIL

BACKGROUND OF THE INVENTION

1. Field of the Invention

The present invention relates to a starter for starting an engine and, particularly, to a connection structure between the motor side fixed contact point and excitation coil of an electromagnetic switch placed in an internal space surrounded by the housing of a starter.

2. Description of the Prior Art

FIG. 7 is a partial cutaway side view of a connection structure between the terminal and excitation coil of an electromagnetic switch for a prior art starter. A similar structure is disclosed by Japanese Patent No. 57-54118. In FIG. 7, reference numeral 100 denotes a housing, 101 an excitation coil stored in the housing 100, 102 a suction coil which is one element of the excitation coil 101, 103 the lead wire of the suction coil 102, 104 a holding coil which is the other element of the excitation coil 101, 105 the lead wire of the holding coil 104, 106 a terminal housing fixed in the opening of the housing 100, 107 an external terminal provided for the terminal housing 106, and 108 solder for connecting the lead wire 105 of the holding coil 104 to the external terminal 107.

SUMMARY OF THE INVENTION

To reduce the size and weight of a starter, there is employed such a structure that an output shaft connected to a motor, the excitation coil of an electromagnetic switch, an overrunning clutch and a pinion gear are stored in an internal space surrounded by a housing, and the excitation coil, overrunning clutch and pinion clutch are arranged coaxial to the output shaft. In this case, the contact point portion of the electromagnetic switch is installed in the housing in such a manner that it extends from the inside to the outside of the housing, and the motor side fixed contact point of the contact point portion and the lead wire of the excitation coil are connected to each other in the internal space surrounded by the housing. Therefore, when the above structure that the external terminal 107 is connected to the suction coil 102 by solder 108 on the exterior side of the housing 100 and the terminal housing 106 is employed as the connection structure between the motor side fixed contact point and excitation coil of the electromagnetic switch placed in the internal space surrounded by the housing of the starter, a soldering iron must be placed in the narrow internal space, thereby reducing work efficiency. To improve soldering work efficiency, the lead wire of the excitation coil must be made long. When the lead wire of the excitation coil is made long, vibration resistance deteriorates. Further, solder must be molten for maintenance which requires the disassembly of the starter.

It is an object of the present invention which has been made to solve the above problems to provide a starter having a connection structure between the motor side fixed contact point and excitation coil of an electromagnetic switch stored in the housing, which provides high work efficiency.

According to a first aspect of the present invention, there is provided a starter in which an output shaft connected to a motor and the excitation coil of an electromagnetic switch arranged coaxial to the output shaft are stored in an internal space surrounded by a housing, the contact point portion of the electromagnetic switch is installed in the housing in such a manner that it extends from the inside to the outside of the housing, and the motor side fixed contact point of the contact point portion and the excitation coil are connected to each other in the internal space, characterized in that a terminal is each provided for the motor side fixed contact point and the excitation coil separately, and the terminal of the motor side fixed contact point and the terminal of the excitation coil are of a snap-on type.

According to a second aspect of the present invention, there is provided a starter, wherein the terminal of the motor side fixed contact point is male and the terminal of the excitation coil is female.

According to a third aspect of the present invention, there is provided a starter in which an output shaft connected to a motor and the excitation coil of an electromagnetic switch arranged coaxial to the output shaft are stored in an internal space surrounded by a housing, the contact point portion of the electromagnetic switch is installed in the housing in such a manner that it extends from the inside to the outside of the housing, and the motor side fixed contact point of the contact point portion and the excitation coil are connected to each other in the internal space, characterized in that a terminal is each provided for the motor side fixed contact point and the excitation coil separately, the terminal of the motor side fixed contact point and the terminal of the excitation coil are placed one upon the other, a working hole is formed in the housing at a position corresponding to a position where the terminal of the motor side fixed contact point and the terminal of the excitation coil are placed one upon the other, and the terminal of the motor side fixed contact point and the terminal of the excitation coil which are placed one upon the other are fixed by a screw through the working hole from the outside of the housing.

According to a fourth aspect of the present invention, there is provided a starter, wherein the terminal of the motor side fixed contact point is caulked to the motor side fixed contact point.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
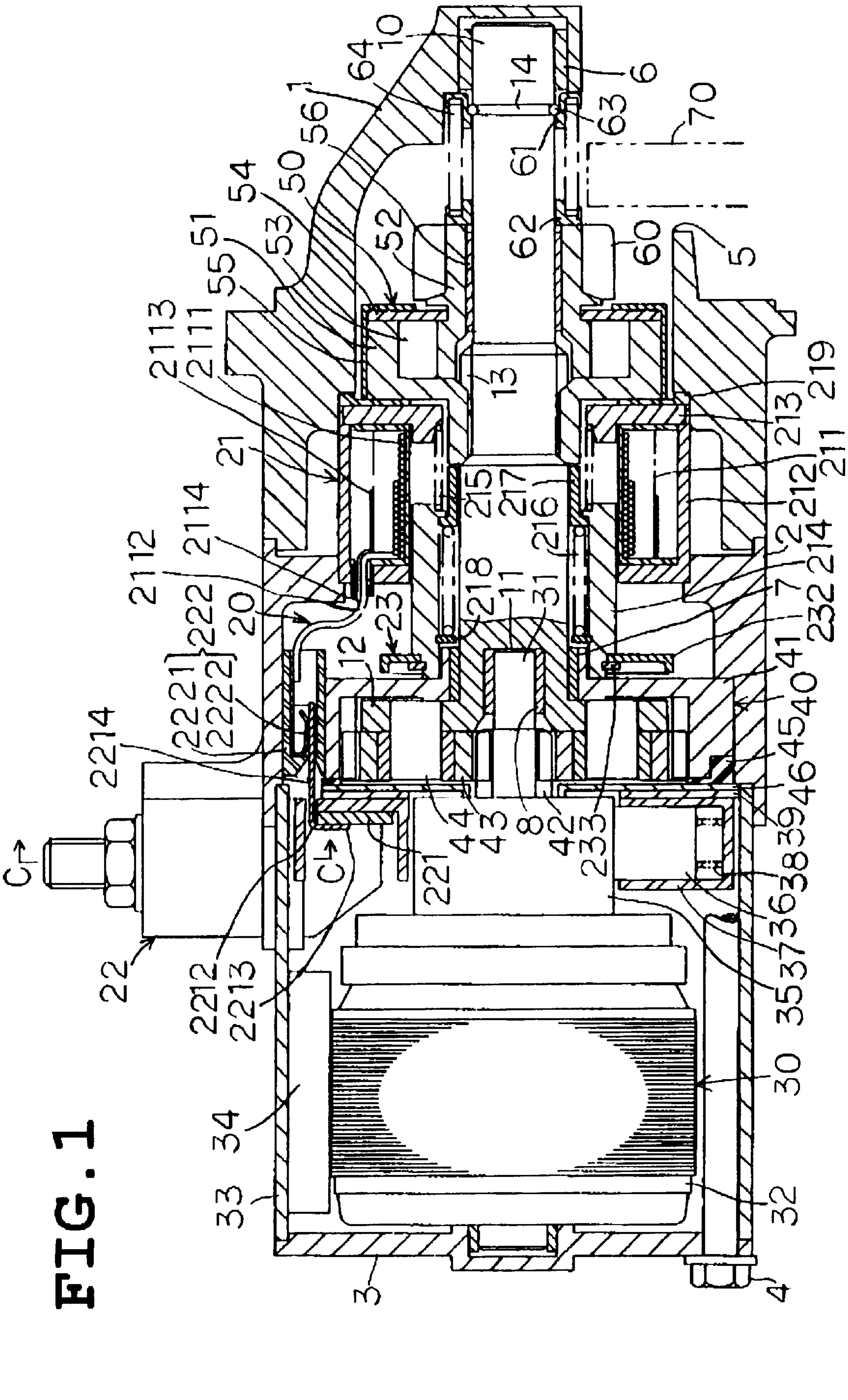
FIG. 1 is a sectional view of an entire starter according to Embodiment 1 of the present invention cut on line A—A in an axial direction of FIG. 3.
Figure 2:
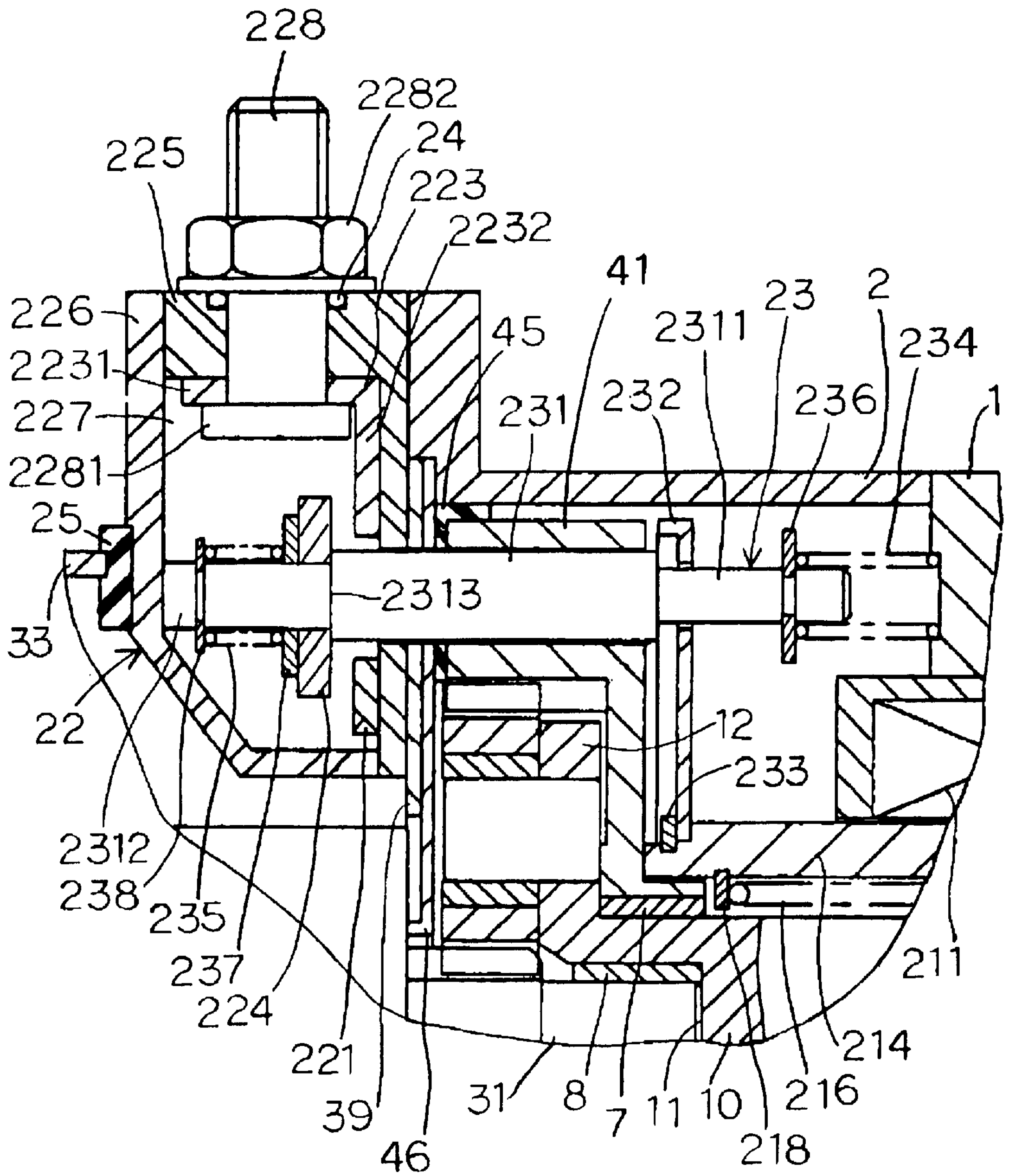
FIG. 2 is a sectional view of part of the starter according to Embodiment 1 cut on line B—B in an axial direction of FIG. 3.
Figure 3:
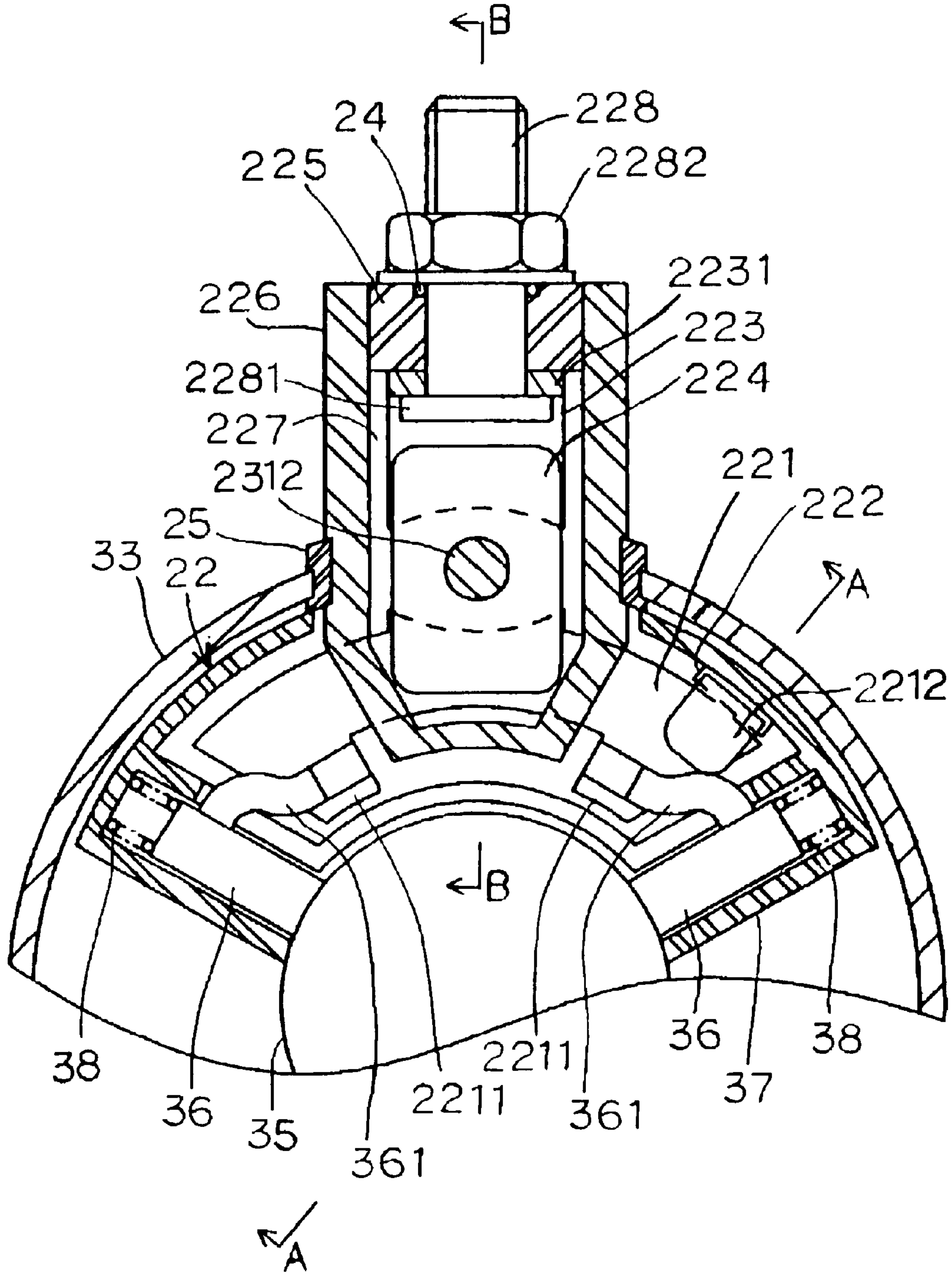
FIG. 3 is a sectional view cut on line C—C in a radial direction of FIG. 1.
Figure 4:
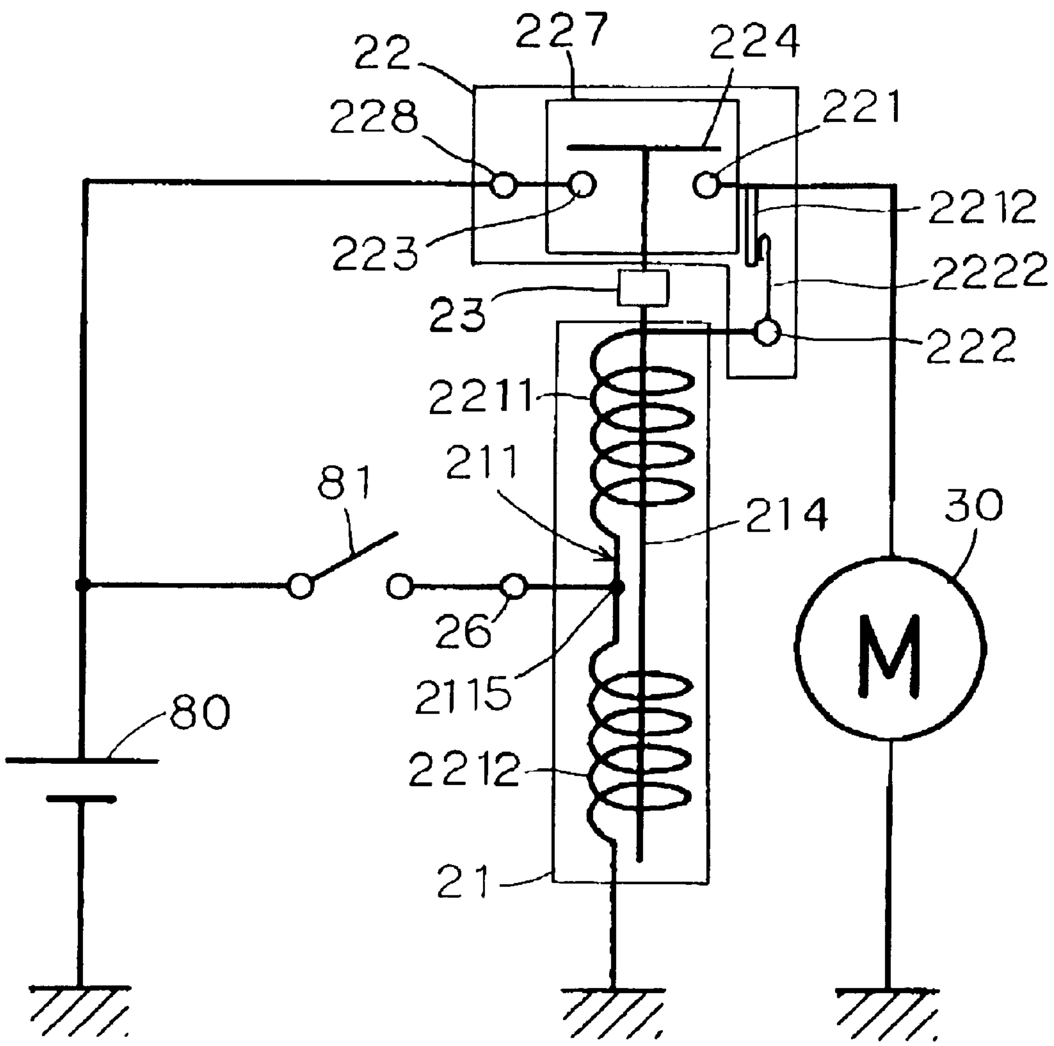
FIG. 4 is a diagram of the equivalent circuit of the starter of Embodiment 1.

FIGS. 1 to 4 show Embodiment 1 of the present invention. FIG. 1 is a sectional view of an entire starter cut on line A—A in the axial direction of FIG. 3, FIG. 2 is a partial sectional view of the starter cut on line B—B in the axial direction of FIG. 3, FIG. 3 is a sectional view cut on line C—C in the radial direction of FIG. 1, and FIG. 4 is a diagram of the equivalent circuit of the starter.

In FIG. 1, the starter presents an almost bullet-like external appearance because it is covered hermetically with a plurality of housings consisting of a front bracket 1, center bracket 2, yoke 33 and rear bracket 3. The bolts 4 are fastened to the front bracket 1 from the rear bracket 3 through the yoke 33 and the center bracket 2 to connect the plurality of housings coaxially. A portion of the front bracket 1 into which the ring gear 70 of an engine is inserted is formed as an opening 5. An output shaft 10, an electromagnetic switch 20, a DC motor 30 as a motor, a speed reduction unit 40, an overrunning clutch 50 and a pinion gear 60 are installed in the inside of the starter. Since the electromagnetic switch 20, the overrunning clutch 50 and the pinion gear 60 are arranged coaxial to the output shaft 10, the starter of Embodiment 1 is called “coaxial starter”. The yoke 33 is formed as a cylinder whose one end is closed and the other end is open. When the closed end of the yoke 33 is used as the rear bracket 3, the yoke 33 and the rear bracket 3 are integrated with each other as a single unit, thereby reducing the number of parts. In the following description, the DC motor 30 side is called “rear side” and the ring gear 70 side is called “front side”.

The DC motor 30 comprises a motor shaft 31, armature 32, yoke 33, fixed magnetic poles 34, commutator 35, brushes 36, brush holder 37, brush springs 38 and brush holder base 39. The armature 32 is constituted such that an armature coil is wound round an armature iron core fixed coaxial to the rear side of the motor shaft 31. The armature coil is connected to the commutator 35. The DC motor 30 is available in a 2-pole DC motor, 4-pole DC motor and 6-pole DC motor according to the number of fixed magnetic poles 34. In the case of a 6-pole DC motor, for example, the number of fixed magnetic poles 34 is 6 and all of the fixed magnetic poles 34 are fixed to the inner wall of the yoke 33 formed cylindrical from iron. The plurality of fixed magnetic poles are placed in such a manner that the N poles of fixed magnetic poles 34 and the S poles of fixed magnetic poles 34 adjacent to the above fixed magnetic poles 34 are arranged alternately in the circumferential direction of the yoke 33. The front end portion of the motor shaft 31 extends through the inside of the commutator 35 and is rotatably fitted in the recessed portion 11 of the output shaft 10 through a bearing 8. The brushes 36 and the brush springs 38 are stored in the brush holder 37 arranged around the commutator 35. The brush springs 38 press the brushes 36 against the commutator 35. The brush holder base 39 is formed of a looped metal plate surrounding the commutator 35 and fixed to the front side of the brush holder 37 to support the brush holder 37 and a contact point chamber base 225.

The output shaft 10 is arranged on the same straight line as the motor shaft 31 on the front side of the DC motor 30. The front end portion of the output shaft 10 is rotatably supported by the front end portion of the front bracket 1 through a bearing 6. The rear end portion of the output shaft 10 is rotatably supported by the center portion of the internal gear 41 of the speed reducing unit 40 through a bearing 7. The recessed portion 11 is formed in the rear end surface of the output shaft 10. A flange 12 is formed on the output shaft 10 on the rear side of the bearing 7 in such a manner that it projects outward from the peripheral surface in a radial direction. A helical spline 13 and an annular groove 14 are formed on the rear side and the front side of the peripheral surface of the output shaft 10 between the bearing 6 and the bearing 7, respectively.

The electromagnetic switch 20 comprises a solenoid portion 21, contact point portion 22 and coupling unit 23. The solenoid portion 21 comprises an excitation coil 211, coil case 212, core 213, plunger 214, plunger spring 215, clutch spring 216, clutch pressing member 217 and spring bearing 218. The cylindrical excitation coil 211 is stored in an internal space surrounded by the cylindrical core 213 made from an iron-based metal arranged around the output shaft 10 and the cylindrical coil case 212 made from an iron-based metal attached to the core 213. The excitation coil 211 consists of an inner suction coil 2111 and an outer holding coil 2113. An insulator sheathed wire used for the suction coil 2111 is thicker than an insulator sheathed wire used for the holding coil 2113. A lead wire 2112 at one end of the suction coil 2111 is drawn to the outside of the coil case 212. A lead wire 2114 at one end of the holding coil 2113 is drawn to the outside of the coil case 212 and connected to the coil case 212. The other end of the suction coil 2111 and the other end of the holding coil 2113 are connected to each other.

The cylindrical plunger 214 is placed around the output shaft 10 between the core 213 and the internal gear 41. The plunger spring 215 is shaped like a coil surrounding the output shaft 10, interposed between the core 213 and the plunger 214 and gives the core 213 and the plunger 214 spring force having such a direction that they part from each other. While the core 213 is received by the front bracket 1 through a packing 219 so that it does not go forward, the plunger 214 compresses the plunger spring 215 by the magnetomotive force of the excitation coil 211 and moves forward along the output shaft 10. When the magnetomotive force of the excitation coil 211 disappears, the plunger 214 moves backward along the output shaft 10 by the spring force of the plunger spring 215 and butts against the internal gear 41.

The clutch spring 216 is installed in the inside of the plunger 214. The clutch spring 216 is shaped like a coil surrounding the output shaft 10, interposed between the cylindrical clutch pressing member 217 surrounding the output shaft 10 and the annular spring bearing 218 surrounding the output shaft 10 and gives the clutch pressing member 217 and the spring bearing 218 spring force having such a direction that they part from each other. When the clutch pressing member 217 is inserted into the inside of the plunger 214 from the rear side, an annular projection portion projecting outward from the peripheral surface on the rear side of the clutch pressing member 217 butts against an annular projection portion projecting inward from the inner wall on the front side of the plunger 214, and the front side of the clutch pressing member 217 projects forward from the plunger 214. The spring bearing 218 is fixed on the inner wall of the plunger 214 in such a manner that it does not interfere with the bearing 7 and the internal gear 41 even when the plunger 214 contacts the internal gear 41.

As shown in FIG. 2 and FIG. 3, the contact point portion 22 comprises a motor side fixed contact point 221, coil side terminal 222, battery side fixed contact point 223, movable contact point 224, contact point chamber base 225, contact point chamber cover 226, contact point chamber 227 and external contact stopper 228. In Embodiment 1, the contact point base 225 extends from the brush holder 37 made from an insulating material such as a synthetic resin. The contact point chamber 227 is hermetically formed by combining the contact point chamber base 225 with the contact point chamber cover 226 made from an insulating material. The contact point chamber 227 is formed between adjacent ones of a plurality of brushes 36 which are separated from one another in the circumferential direction of the output shaft 10 in the internal space of the yoke 33. The motor side fixed contact point 221, the battery side fixed contact point 223 and the movable contact point 224 are arranged in the contact point chamber 227.

The motor side fixed contact point 221 is shaped like a semicircular arc plate, separate from the output shaft 10 and fixed to the contact point chamber base 225. A plurality of brush connection portions 2211 are provided on the inner portion of the motor side fixed contact point 221 projecting from the contact point chamber cover 226 toward both sides. Brush wires 361 extending from the brushes 36 are connected to the brush connection portions 2211, respectively. A male terminal 2212 is provided on one side of the outer portion of the motor side fixed contact point 221. The base portion 2213 bent in the radial direction of the output shaft 10 of the male terminal 2212 is contacted and fixed to the rear surface of the motor side fixed contact point 221 and the end portion 2214 bent forward in a direction parallel to the axial direction of the output shaft 10 from the base portion 2213 projects into the internal space of the center bracket 2 through the contact point chamber base 225. The male terminal 2212 is fixed to the motor side fixed contact point 221 as a separate unit. However, when the male terminal 2212 is formed by bending the front portion of the motor side fixed contact point 221, the number of parts can be reduced.

The coil side terminal 222 is interposed between the speed reducing unit 40 and the center bracket 2. In Embodiment 1, the coil side terminal 222 is a female terminal to be mated with the male terminal 2212 and comprises a connector case 2221 made from an insulating material such as a synthetic resin and fixed to the inner wall of the center bracket 2 and a female terminal 2222 stored in the inside of the connector case 2221. The lead wire 2112 of the suction coil 2111 is connected to the female terminal 2222 by caulking, soldering or welding. When the end portion 2214 of the male terminal 2212 is inserted into the inside of the connector case 2221 from the rear side, the end portion 2214 presses outward in the radial direction of the output shaft 10 a bent end portion bent forward from the rear side of the female terminal 2222, the end portion of the female terminal 2222 is bent, and the male terminal 2212 and the female terminal 2222 are elastically contacted to each other. In other words, the male terminal 2212 of the motor side fixed contact point 221 and the female terminal 2222 of the coil side terminal 222 are formed as snap-on terminals which are mated with each other in a direction parallel to the output shaft 10.

In FIG. 2 and FIG. 3, the battery side fixed contact point 223 comprises a base portion 2231 extending along the contact point chamber base 225 forming the outer wall of the contact point chamber 227 and an end portion 2232 bent from the base portion 2231 and extending along the contact point chamber base 225 forming the front wall of the contact point chamber 227. The end portion 2232 and the motor side fixed contact point 221 are separated from each other in the radial direction of the output shaft 10 and arranged along the contact point chamber base 225. The external contact stopper 228 comprises a bolt 2281 and a nut 2282. The bolt 2281 is connected to the base portion 2231 of the battery side fixed contact point 223 through the contact point chamber base 225 forming the outer wall of the contact point chamber 227 in such a manner that it does not turn. The nut 2282 is fastened to the end portion projecting outward from the contact point chamber base 225 of the bolt 2281.

The movable contact point 224 is shaped like a plate, can be connected to the end portion 2232 of the battery side fixed contact point 223 and the motor side fixed contact point 221 and is coupled to the plunger 214 by the coupling unit 23. When the plunger 214 is moved forward by the magnetomotive force of the excitation coil 211, the movable contact point 224 is moved forward by the coupling unit 23 and connected to the motor side fixed contact point 221 and the battery side fixed contact point 223. When the plunger 214 is moved backward by the plunger spring 215 shown in FIG. 1, the movable contact point 224 is separated from the motor side fixed contact point 221 and the battery side fixed contact point 223 by the coupling unit 23. That is, by the forward or backward movement of the plunger 214, the movable contact point 224 is connected to or disconnected from the motor side fixed contact potion 221 and the battery side fixed contact point 223, thereby carrying out the ON/OFF operation of an electric path between the motor side fixed contact point 221 and the battery side fixed contact point 223.

The coupling unit 23 comprises a contact point shaft 231, shift plate 232, snap ring 233, front spring 234, rear spring 235 and spring bearings 236, 237 and 238. The contact point shaft 231 extends from the contact point chamber 227 to the internal space of the center bracket 2 through the contact point chamber base 225, the brush holder base 39, the center plate 46, the packing 45 and the internal gear 41 in such a manner that it can move forward and backward. In Embodiment 1, the contact point shaft 231 is supported by the internal gear 41 in such a manner that it can move forward and backward.

The shift plate 232 is fitted onto the peripheral portion on the rear side of the plunger 214 and fixed to the plunger 214 by the snap ring 233. The front small-diameter shaft portion 2311 of the contact point shaft 231 projecting into the internal space of the center bracket 2 from the internal gear 41 extends through the shift plate 232 in such a manner that it can move forward and backward. The spring bearing 236 is fixed to the front small-diameter shaft portin 2311 projecting forward from the shift plate 232. The front spring 234 is shaped like a coil surrounding the front small-diameter shaft portion 2311 and interposed between the front bracket 1 forming the front wall of the internal space of the center bracket 2 and the spring bearing 236. The front spring 234 gives the contact point shaft 231 spring force for moving backward the contact point shaft 231 through the spring bearing 236. The rear end portion of the contact point shaft 231 butts against the contact point chamber cover 226 by the spring force of the front spring 234. The movable contact point 224 and the spring bearing 237 are fitted onto the rear small-diameter shaft portion 2312 of the contact point shaft 231 projecting into the contact point chamber 227 from the rear side in such a manner that they can move forward and backward. The spring bearing 238 is fixed to the rear small-diameter shaft portion 2312 on the rear side of the spring bearing 237. The rear spring 235 is shaped like a coil surrounding the rear small-diameter shaft portion 2312 and interposed between the spring bearing 237 and the spring bearing 238. The rear spring 235 gives the movable contact point 224 spring force for moving forward the movable contact point 224 through the spring bearing 237. The movable contact point 224 is butted against the rear stepped portion 2313 of the contact point shaft 231 by the spring force of the rear spring 235.

That is, when the contact point shaft 231 butts against the contact point chamber cover 226 and the movable contact point 224 is butted against the rear stepped portion 2313, the movable contact point 224 is separated from the motor side fixed contact point 221 and the battery side fixed contact point 223 for OFF operation. When the plunger 214 is moved forward by the magnetomotive force of the excitation coil 211, the clutch pressing member 217 shown in FIG. 1 presses forward the overrunning clutch 50 shown in FIG. 1, the front end surface of the pinion gear 60 shown in FIG. 1 butts against the rear end surface of the ring gear 70, and the clutch spring 216 is compressed, the shift plate 232 moves forward the contact point shaft 231, and the movable contact point 224 contacts the battery side fixed contact point 223 and the motor side fixed contact point 221 for ON operation. When the plunger 214 is moved backward by the spring force of the plunger spring 215 shown in FIG. 1, the shift plate 232 moves backward away from the spring bearing 236, the contact point shaft 231 is moved backward by the spring force of the front spring 234, and the movable contact point 224 is separated from the motor side fixed contact point 221 and the battery side fixed contact point 223 for OFF operation.

In FIG. 2 and FIG. 3, reference numeral 24 denotes a packing installed in the interface between the bolt 2281 and the contact point chamber base 225, and 25 a packing installed in the interface between the contact point chamber cover 226 and the yoke 33.

Returning to FIG. 1, the speed reducing unit 40 comprises the internal gear 41, sun gear 42, a plurality of planetary gears 43, planetary gear shaft 44, packing 45 and center plate 46. The peripheral portion of the internal gear 41 is placed on the inner wall of the center bracket 2 from the rear side, whereby the internal gear 41 is fixed to the center bracket 2. The sun gear 42 is fitted onto the peripheral surface of the motor shaft 31 in such a manner that it can turn together with the motor shaft 31. The plurality of planetary gears 43 are interposed between the sun gear 42 and the internal gear 41 so that they mesh with the sun gear 42 and the internal gear 41. These planetary gears 43 are held by the flange 12 of the output shaft 10 in such a manner that they can turn by the planetary gear shaft 44 independently. Therefore, when the motor shaft 31 turns, the planetary gears 43 turn round the sun gear 42 while they turn on the planetary gear shaft 44, and the rotation speed of the motor shaft 31 is reduced and transmitted to the output shaft 10 by the planetary gear shaft 44.

The center plate 46 is a looped metal plate surrounding the output shaft 10 and placed upon the rear open end surface of the internal gear 41 through the packing 45 to cover the rear opening of the internal gear 41. The brush holder base 39 is placed upon the rear side of the center plate 46, the periphery of the center plate 46 and the periphery of the brush holder base 39 are fitted in the interface between the center bracket 2 and the yoke 33, and the center plate 46 and the brush holder base 39 separates the internal space of the center bracket 2 from the internal space of the yoke 33.

The overrunning clutch 50 is a one-way clutch comprising a clutch outer 51, clutch inner 52, a plurality of clutch rollers 53, clutch washer 54, clutch cover 55 and bearing 56. The clutch outer 51 consists of a cylindrical portion mated with the helical spline 13 of the output shaft 10 and a roller cam forming a wedge-shaped space when it is combined with the clutch inner 52. The clutch inner 52 is cylindrical and rotatably attached to the output shaft 10 on the front side of the helical spline 13 through the bearing 56. The clutch rollers 53 are stored in an internal space formed by combining the clutch outer 51 with the clutch inner 52. The clutch washer 54 is placed on the front end surface of the clutch outer 51 and the peripheral surface of the clutch inner 52 to cover the internal space storing the clutch rollers 53. The clutch cover 55 holds the clutch outer 51 and the clutch washer 54.

The pinion gear 60 is installed on the peripheral surface of the clutch inner 52 in such a manner that it can turn together with the clutch inner 52. An annular front spring bearing 61 and an annular rear spring bearing 62 are rotatably attached to the output shaft 10 on the front side of the pinion gear 60. The inner portion of the front spring bearing 61 is stopped by a snap ring 63 fitted in the annular groove 14 of the output shaft 10 so that it does not move forward from the snap ring 63. A coil-shaped pinion spring 64 surrounding the output shaft 10 is placed between the front spring bearing 61 and the rear spring bearing 62. The front end portion of the pinion spring 64 is fitted onto the peripheral surface of the front spring bearing 61. The front end of the pinion spring 64 butts against an annular projection portion projecting outward from the front end portion of the front spring bearing 61. The rear end portion of the pinion spring 64 is fitted onto the peripheral surface of the rear spring bearing 62. The rear end of the pinion spring 64 butts against an annular projection portion projecting outward from the rear end portion of the rear spring bearing 62. The pinion spring 64 gives the rear spring bearing 62 spring force for moving backward the rear spring bearing 62 in parallel to the axial direction of the main shaft 10. The rear spring bearing 62 is butted against the front end surface of the clutch inner 52 and the front end surface of the bearing 56 by the spring force of the pinion spring 64 to move backward the overrunning clutch 50 and the pinion gear 60. A gap is formed between the inner wall of the pinion spring 64 and the peripheral surface of the output shaft 10.

As shown in FIG. 4, the positive pole of the battery 80 is connected to the external contact stopper 228 of the contact point portion 22. An ignition switch side terminal 26 is connected to a connection point 2115 where the other end of the suction coil 2111 and the other end of the holding coil 2113 are connected to each other. The ignition switch side terminal 26 is provided separate from the contact point 22 and drawn to the outside of the center bracket 2 or the yoke 33 shown in FIG. 1 in such a manner that it is insulated. The positive pole of the battery 80 is wired to the ignition switch side terminal 26 projecting outward from the center bracket or the yoke 33 through an ignition switch 81.

When the ignition switch 81 is turned on, the plunger 214 shown in FIG. 1 is moved in the direction of the core 213 (forward) by the magnetomotive force of the excitation coil 211, the clutch pressing member 217 presses forward the overrunning clutch 50, the overrunning clutch 50 moves forward, guided by the helical spline 13 and turned in one direction, the front end surface of the pinion gear 60 contacts the rear end surface of the ring gear 70, the forward movement of the pinion gear 60 is temporarily stopped, the clutch spring 216 contracts, and the plunger 214 continues moving. The movable contact point 224 shown in FIG. 2 is moved forward by the forward movement of the plunger 214 caused by the magnetomotive force of the excitation coil 211 through the coupling unit 23 and connected to the motor side fixed contact point 221 and the battery side fixed contact point 223, and the DC motor 30 is driven.

In this state, the drive force of the DC motor 30 shown in FIG. 1 is transmitted to the overrunning clutch 50 from the speed reducing unit 40 by the output shaft 10. Then, when the clutch outer 51 is turned by the helical spline 13 and the clutch rollers 53 are turned by the rotation of the clutch outer 51, the clutch rollers 53 are moved into the narrow space of an unshown groove in the clutch outer 51 by the spring force of an unshown spring, the clutch outer 5, the clutch inner 52 and the clutch rollers 53 are mated with one another. Thereby, the pinion gear 60 is connected to the output shaft 10 and turned in one direction, the pinion gear 60 is meshed with the ring gear 70 by the spring force of the clutch spring 216 which has been contracted to turn the ring gear 70 when the mountains and valleys of the teeth of the pinion gear 60 meet the valleys and mountains of the teeth of the ring gear 70, and the engine starts.

When the engine is started, the rotation of the ring gear 70 becomes fast, and the pinion gear 60 is turned by the rotation of the ring gear 70, the clutch rollers 53 move into the wide space of the above unshown groove, and the clutch outer 51, the clutch inner 52 and the clutch rollers 53 are disengaged from one another. Thereby, the pinion gear 60 is disconnected from the output shaft 10. When the ignition switch 81 is turned off, the magnetomotive force of the excitation coil 211 lowers, and the pressing force of the overrunning clutch 50 by the plunger 214 drops in this state, the pinion gear 60 is moved backward by the spring force of the pinion spring 64, the pinion gear 60 and the ring gear 70 are disengaged from each other, and the pinion gear 60 is released from the rotation of the engine.

The assembly order of the starter in Embodiment 1 will be described with reference to FIG. 1 mainly. The solenoid portion 21 is first inserted into the center bracket 2 from the front side. At this point, the solenoid portion 21 has the excitation coil 211, coil case 212, core 213, plunger 214, plunger spring 215, clutch spring 216, clutch pressing member 217, spring bearing 218 and packing 219, the shift plate 232 of the coupling unit 23 is fixed to the plunger 214 by the snap ring 233, and the coil side terminal 222 comprising the connector case 2221 and the female terminal 2222 is connected to the excitation coil 211. The coil side terminal 222 is fixed to the inner wall of the center bracket 2 by an unshown adhesive or by mating a projection portion provided on the connector case 2221 with a hole formed in the center bracket 2 when the solenoid portion 21 is inserted into the center bracket 2.

Thereafter, the internal gear 41 is inserted into the center bracket 2 from the rear side, and the plurality of planetary gears 43 are provided on the flange 12 of the output shaft 10 through the planetary gear shaft 44. This output shaft 10 is inserted into the internal gear 41 through the bearing 7 from the rear side, the plurality of planetary gears 43 are meshed with the internal gear 41, unshown grease is applied to the internal gear 41 and the planetary gears 43, and the packing 45 and the center plate 46 are placed upon the internal gear 41.

The contact point portion 22 and the brush holder 37 are attached to the center bracket 2 from the rear side. At this point, as shown in FIG. 2, the contact point portion 22 has the motor side fixed contact point 221, the battery side fixed contact point 223, the movable contact point 224, the contact point chamber base 225, the contact point chamber cover 226, the contact point chamber 227, the external contact stopper 228, the packing 24, the contact point shaft 231 of the coupling unit 23, the rear spring 235 and the spring bearings 237 and 238 excluding the coil side terminal 222. The brush holder 37 has the brushes 36, the brush springs 38 and the brush holder base 39. The motor side fixed contact point 221 is connected to the brush wires 361 (see FIG. 3) and the end portion 2214 of the male terminal 2212 of the motor side fixed contact point 221 projects forward from the contact point chamber base 225 and the brush holder base 39.

In short, since the male terminal 2212 of the motor side fixed contact point 221 and the coil side terminal 222 are of a snap-on type in the structure of Embodiment 1, when the contact point portion 22 having the motor side fixed contact point 221 and the center bracket 2 having the coil side terminal 222 are to be assembled together, the end portion 2214 of the male terminal 2212 projecting forward from the contact point chamber base 225 and the brush holder base 39 of the motor side fixed contact point 221 extends forward over the center plate 46 and is elastically connected to the female terminal 2222 of the coil side terminal 222 situated on the center bracket 2. Therefore, the motor side fixed contact point 221 of the electromagnetic switch 20 arranged on the rear side of the center plate 46 and the excitation coil 211 of the electromagnetic switch 20 arranged on the front side of the center plate 46 are connected to each other by snap-on connection between the male terminal 2212 and the female terminal 2222 to be elastically connected to the male terminal 2212, thereby making easy the work of connecting the motor side fixed contact point 221 and the excitation coil 211 of the electromagnetic switch 20.

Thereafter, the armature 32 having the motor shaft 31 and the commutator 35 is inserted into the brush holder 37 from the rear side. At this point, the motor shaft 31 is inserted into the recessed portion 11 of the output shaft 10 through the brush holder base 39 and the center plate 46 from the brush holder 37 by the bearing 8, the sun gear 42 of the speed reducing unit 40 provided on the armature 32 is meshed with the internal gear 41 and the planetary gears 43, and the brushes 36 are contacted to the commutator 35 by the spring force of the brush springs 38. Thereafter, the yoke 33 having the fixed magnetic poles 34 fixed thereto is mated with the center bracket 2 from the rear side to cover the armature 32. At this point, the packing 25 (see FIG. 2) is inserted into the interface between the yoke 33 and the contact point chamber cover 226.

The overrunning clutch 50 having the pinion gear 60, the rear spring bearing 62, the pinion spring 64 and the front spring bearing 61 are fitted onto the output shaft 10 projecting forward from the solenoid portion 21 from the front side in the order named, the snap ring 63 is fitted in the annular groove 14 of the output shaft 10, the rear end portion of the front spring 234 (see FIG. 2) is mated with the contact point shaft 231 (see FIG. 2) projecting forward from the spring bearing 236 (see FIG. 2), and the front bracket 1 is mated with the center bracket 2 from the front side to cover the front spring bearing 61, the rear spring bearing 62, the pinion spring 64, the pinion gear 60, the overrunning clutch 50, the solenoid portion 21, the snap ring 63, the spring bearing 236, the front spring 234 and the contact point shaft 231. At this point, the output shaft 10 projecting forward from the front spring bearing 61 is inserted into the front bracket 1 through the bearing 6.

The work of fitting the overrunning clutch 50 onto the output shaft 1 may be carried out before or after the work of installing the contact point portion 22, the brush holder 37, the armature 32 and the yoke 33 in the center bracket 2, or both of the works may be carried out at the same time.

The rear bracket 3 is placed upon the yoke 33 from the rear side, and the bolts 4 are fastened to the front bracket 1 from the rear bracket 3 through the yoke 33 and the center bracket 2. Thereby, the assembly of the starter shown in FIG. 1 is completed.

When the interior of the starter is repaired, the bolts 4 are removed, and the yoke 33 and the contact point portion 22 are removed from the center bracket 2 to the rear side, thereby making it possible to disconnect the male terminal 2212 of the motor side fixed contact point 221 from the female terminal 2222 of the coil side terminal 222.

Since the terminal provided for the motor side fixed contact point 221 is a male terminal 2212 and the terminal provided for the excitation coil 211 is a female terminal 2222, the outer size in the radial direction of the housing can be reduced, compared with a case where the terminal provided for the motor side fixed contact point 221 is female and the terminal provided for the excitation coil 211 is male. This is because when the terminal provided for the motor side fixed contact point 221 is female, portions where the contact point portion 22 is installed of the yoke 33 and the center bracket 2 must be widened to form a wide space in a radial direction for installing the female terminal between the motor side fixed contact point 221 and the yoke 33 without changing the communicator 35 and a large number of parts arranged around the commutator 35. In contrast to this, when the terminal provided for the motor side fixed contact point 221 is a male terminal 2212 and the terminal provided for the excitation coil 211 is a female terminal 2222 as in Embodiment 1, the space required in a radial direction by the male terminal 2212 is smaller than the space required by the female terminal 2222, and an internal portion in which the coil side terminal 222 having the female terminal 2222 is stored of the center bracket and an external portion in which the female terminal 222 is stored of the internal gear 41 can be depressed like a groove.

Embodiment 2

Figure 5:
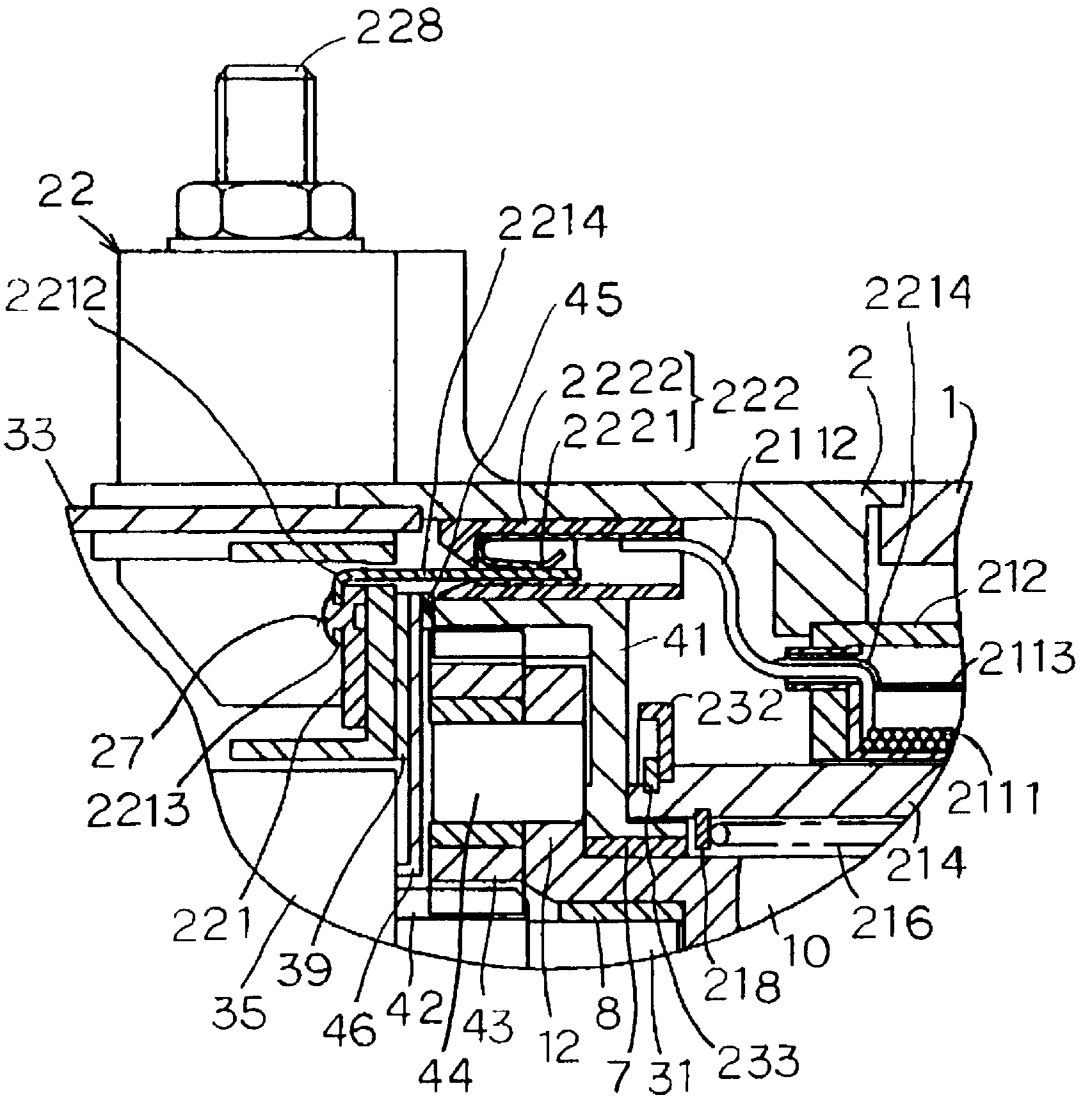
FIG. 5 is a sectional view of Embodiment 2 of the present invention.

FIG. 5 is a sectional view of Embodiment 2 of the present invention. In FIG. 5, the base portion 2213 of the male terminal 2212 is connected to the motor side fixed contact point 221 by a caulk metal 27, thereby improving work efficiency, compared with a case where the male terminal 2212 and the motor side fixed contact point 221 are connected to each other by solder. This is because when the male terminal 2212 and the motor side fixed contact point 221 are connected to each other by solder, it takes time to heat all of the male terminal 2212 and the motor side fixed contact point 221 to a temperature required for the solder to be molten and enter the interface between the male terminal 2212 and the motor side fixed contact point 221 as the motor side fixed contact point 221 has a large area and large thickness. In Embodiment 2, the male terminal 2212 and the motor side fixed contact potion 221 can be connected to each other simply by depressing the caulk metal 27 inserted into the base portion 2213 from the front side to the rear side. In the case of Embodiment 2, the caulk metal 27 projects backward from the rear side of the motor side fixed contact point 221. The caulk metal 27 may project forward from the front side of the male terminal 2212 or may be formed as a separate unit from the male terminal 2212 and the motor side fixed contact point 221.

Embodiment 3

Figure 6:
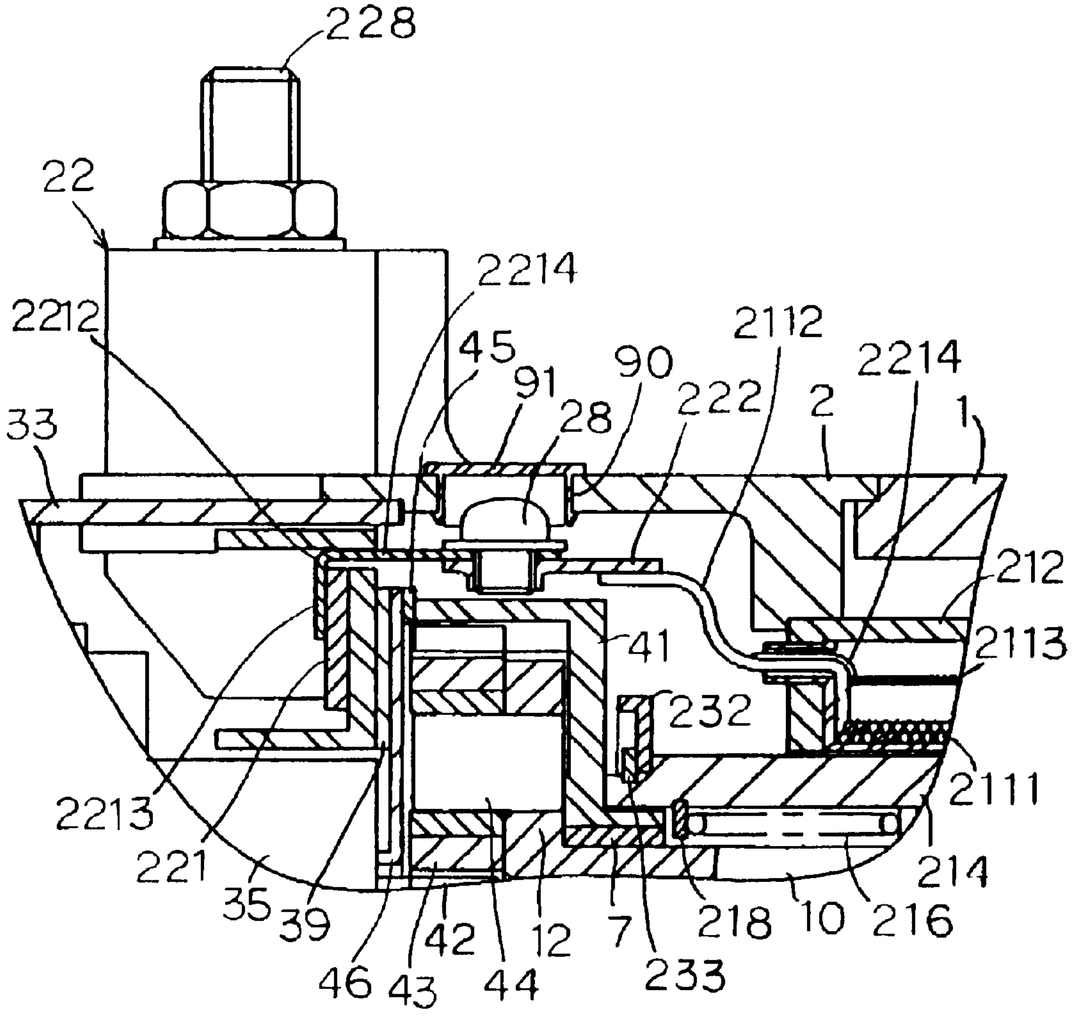
FIG. 6 is a sectional view of Embodiment 3 of the present invention.
Figure 7:
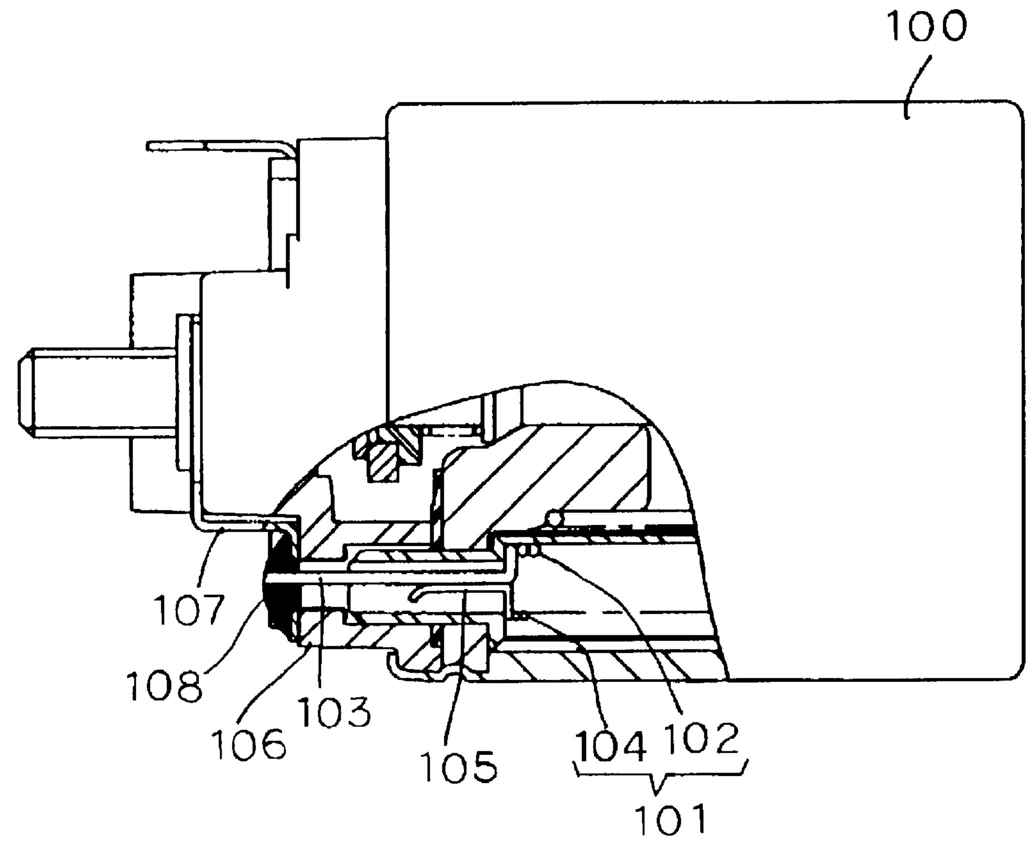
FIG. 7 PRIOR ART
FIG. 7 is a partial cutaway side view of an electromagnetic switch for a prior art starter.

FIG. 6 is a sectional view of Embodiment 3 of the present invention. In FIG. 6, the male terminal 2212 and the coil side terminal 222 are fastened by a bolt 28 on the outside of the yoke 33, thereby simplifying the structure of the coil side terminal 222. The coil side terminal 222 is shaped like a plate and placed under the inner side (inner side in the radial direction of the center bracket 2) of the end portion 2214 of the male terminal 2212. After the bolt 28 is fastened to the coil side terminal 222 from a working hole 90 formed in the center bracket 2 through the end portion 2214 of the male terminal 2212, a cap 91 is placed upon the working hole 90 from the outside of the center bracket 2 to cover the working hole 90 with the cap 91. In Embodiment 3, the male terminal 2212 is situated on the outer side in the radial direction of the center bracket 2 and the coil side terminal 222 is situated on the inner side in the radial direction of the center bracket 2. The male terminal 2212 may be situated on the inner side in the radial direction of the center bracket 2, the coil side terminal 222 may be situated on the outer side in the radial direction of the center bracket 2, and the male terminal 2212 and the coil side terminal 222 may be fastened by the bolt 28. The terminal situated on the outer side in the radial direction of the center bracket 2 may be of a flat type having a through hole into which the bolt 28 can be inserted or spade type having a groove into which the bolt 28 can be inserted.

In Embodiment 3, when the interior of the starter is repaired, the cap 91 is removed from the center bracket 2, the bolt 28 is loosened from the outside of the center bracket 2 and removed, and the yoke 33 and the contact point portion 22 are removed from the center bracket 2 to the rear side, thereby making it possible to disconnect the male terminal 2212 of the motor side fixed contact point 221 from the coil side terminal 222.

In Embodiment 3, the male terminal 2212 of the motor side fixed contact point 221 may be connected to the coil side terminal 222 with the caulk metal 27 as shown in FIG. 5.

As having been described above, according to the first aspect of the present invention, a terminal is each provided for the motor side fixed contact point and the excitation coil which are connected to each other in the internal space surrounded by the housing of the starter separately, and the terminal of the motor side fixed contact point and the terminal of the excitation coil are of a snap-on type. Therefore, the terminal of the excitation coil stored in the internal space surrounded by the housing and the terminal of the motor side fixed contact point stored in the internal space surrounded by the housing can be connected to each other without using a tool such as a soldering iron in the process of installing the contact point portion in the housing, thereby making it possible to carry out the work of connecting the motor side fixed contact point to the excitation coil in the internal space surrounded by the housing with ease.

According to the second aspect of the present invention, the terminal of the motor side fixed contact point is male and the terminal of the excitation coil is female. Therefore, compared with a case where the terminal of the motor side fixed contact point is female and the terminal of the excitation coil is male, the outer size in the radial direction of the housing does not need to be increased and the starter can be made compact.

According to the third aspect of the present invention, a terminal is each provided for the motor side fixed contact point and the excitation coil which are connected to each other in the internal space surrounded by the housing of the starter separately, a working hole is formed in the housing at a position corresponding to a position where the terminal of the motor side fixed contact point and the terminal of the excitation coil are placed one upon the other, and the terminal of the motor side fixed contact point and the terminal of the excitation coil which are placed one upon the other are fixed by a screw from the outside of the housing through the working hole. Therefore, the terminal of the excitation coil stored in the internal space surrounded by the housing and the terminal of the motor side fixed contact point stored in the internal space surrounded by the housing can be connected to each other by the screw from the outside of the yoke without using a tool such as a soldering iron in the process of installing the contact point portion in the housing, thereby making it possible to carry out the work of connecting the motor side fixed contact point to the excitation coil in the internal space surrounded by the housing with ease.

According to the fourth aspect of the present invention, when the terminal of the motor side fixed contact point is caulked to the motor side fixed contact point, the work of connecting the terminal of the motor side fixed contact point to the motor side fixed contact point is easier than a case where the terminal of the motor side fixed contact point is connected to the motor side fixed contact point by solder.

What is claimed is:

1. A starter in which an output shaft connected to a motor and an excitation coil of an electromagnetic switch arranged coaxial to the output shaft are stored in an internal space surrounded by a housing, a contact point portion of the electromagnetic switch is installed in the housing in such a manner that the contact point portion of the switch extends from an inside to an outside of the housing, and a motor side fixed contact point of the contact point portion and the excitation coil are connected to each other in the internal space, wherein each of the motor side fixed contact point and the excitation coil are separately provided with a terminal, and the terminal of the motor side fixed contact point and the terminal of the excitation coil are of a snap-on type.

2. The starter of claim 1, wherein the terminal of the motor side fixed contact point is a male type connector and the terminal of the excitation coil is a female type connector.

3. The starter of claim 1, wherein the terminal of the motor side fixed contact point is caulked to the motor side fixed contact point.

4. A starter in which an output shaft connected to a motor and an excitation coil of an electromagnetic switch arranged coaxial to the output shaft are stored in an internal space surrounded by a housing, a contact point portion of the electromagnetic switch is installed in the housing in such a manner that the contact point portion of the switch extends from an inside to an outside of the housing, and the motor side fixed contact point of the contact point portion and the excitation coil are connected to each other in the internal space, wherein each of the motor side fixed contact point and the excitation coil are separately provided with a terminal, the terminal of the motor side fixed contact point and the terminal of the excitation coil are placed one upon another, a working hole is formed in the housing at a position corresponding to a position where the terminal of the motor side fixed contact point and the terminal of the excitation coil are placed one upon the other, and the terminal of the motor side fixed contact point and the terminal of the excitation coil which are placed one upon the other are fixed by a screw through the working hole from the outside of the housing.

* * * * *